United States Patent
Lazar et al.

(10) Patent No.: US 8,555,342 B1
(45) Date of Patent: Oct. 8, 2013

(54) PROVIDING SECURE ACCESS TO A SET OF CREDENTIALS WITHIN A DATA SECURITY MECHANISM OF A DATA STORAGE SYSTEM

(75) Inventors: Gregory W. Lazar, Upton, MA (US); Greg Mogavero, Needham, MA (US); Michael Hamel, Milford, MA (US); Yidong Wang, Upton, MA (US); Prakash Chanderia, Shrewsbury, MA (US); Feng Zhou, Framingham, MA (US); Ashwin Ramkrishna Tidke, Navi Mumbai (IN)

(73) Assignee: EMC Corporation, Hopkinton, MA (US)

( * ) Notice: Subject to any disclaimer, the term of this patent is extended or adjusted under 35 U.S.C. 154(b) by 883 days.

(21) Appl. No.: 12/645,857

(22) Filed: Dec. 23, 2009

(51) Int. Cl.
*G06F 12/14* (2006.01)
*G06F 7/04* (2006.01)
*G06F 15/16* (2006.01)
*G06F 21/31* (2013.01)
*H04L 29/06* (2006.01)

(52) U.S. Cl.
CPC .............. *G06F 21/31* (2013.01); *H04L 63/083* (2013.01)
USPC ........................ 726/3; 726/7; 726/19; 713/193

(58) Field of Classification Search
None
See application file for complete search history.

(56) References Cited

U.S. PATENT DOCUMENTS

| | | | |
|---|---|---|---|
| 6,148,402 A * | 11/2000 | Campbell | 726/10 |
| 6,571,336 B1 * | 5/2003 | Smith, Jr. | 713/184 |
| 7,038,932 B1 * | 5/2006 | Eliason | 365/145 |
| 7,120,690 B1 | 10/2006 | Krishnan et al. | |
| 7,130,899 B1 | 10/2006 | Baure et al. | |
| 7,502,898 B2 | 3/2009 | Blumenau et al. | |
| 7,660,902 B2 | 2/2010 | Graham et al. | |
| RE41,186 E | 3/2010 | Pensak et al. | |
| 7,716,484 B1 | 5/2010 | Kaliski, Jr. | |
| 7,752,492 B1 * | 7/2010 | Armangau et al. | 714/6.13 |
| 8,095,966 B1 | 1/2012 | Carson, Jr. et al. | |
| 8,170,213 B1 | 5/2012 | Harwood et al. | |
| 8,185,639 B2 | 5/2012 | Krishnan et al. | |
| 2003/0084290 A1 * | 5/2003 | Murty et al. | 713/168 |
| 2005/0044425 A1 * | 2/2005 | Hypponen | 713/202 |
| 2006/0053308 A1 * | 3/2006 | Zimmerman | 713/193 |
| 2006/0195704 A1 * | 8/2006 | Cochran et al. | 713/193 |
| 2008/0092029 A1 * | 4/2008 | Arakawa et al. | 714/801 |
| 2009/0327471 A1 * | 12/2009 | Astete et al. | 709/223 |

* cited by examiner

*Primary Examiner* — Matthew Henning
(74) *Attorney, Agent, or Firm* — BainwoodHuang

(57) ABSTRACT

A technique provides secure access to a set of credentials within a data storage system. The technique involves obtaining a unique identifier (e.g., a hostname which is unique to the system) and a set of stable values (e.g., machine-generated codes which are random to users of the system); and, in response to a storage request from a client application, storing a set of credentials of the client application within a data security mechanism of the data storage system. The set of credentials is in encrypted form when stored within the data security mechanism of the data storage system. The technique further involves configuring the data security mechanism of the data storage system to provide the set of credentials in non-encrypted form in response to new fingerprints matching a system fingerprint which is formed at least in part from the unique identifier and the set of stable values.

22 Claims, 4 Drawing Sheets

PROVIDING SECURE ACCESS TO A SET OF CREDENTIALS WITHIN A DATA SECURITY MECHANISM OF A DATA STORAGE SYSTEM

BACKGROUND

A conventional data storage system includes a set of hosts, a set of storage processor modules and an array of disk drives. During operation, the set of storage processor modules performs data storage operations on behalf of the set of hosts (e.g., stores host data into the array of disk drives, and loads host data from the array of disk drives).

Some disk drive arrays contain hundreds of replaceable disk drives (e.g., hot swappable disk drives). If a particular disk drive fails, a technician simply removes the failed disk drive from its slot, and inserts a new disk drive in its place. The set of storage processors then performs a data recovery operation to restore data, which resided on the failed disk drive, onto the new disk drive.

Similarly, other parts of the data storage system may fail and require replacement. For example, some data storage systems include two replaceable storage processor modules and replaceable network modules for fault tolerance and load balancing purposes.

SUMMARY

Unfortunately, the above-described conventional data storage system may lack certain capabilities. For example, for security, it may be important to impose the need for login usernames and passwords on certain client applications running on the data storage system. This username and password information must be stored in a secure manner for the login mechanism to be effective. Similarly, other types of data may need to be securely stored by the data storage system such as virtual machine configuration information (e.g., if software managing the data storage system requires the ability to display certain virtual machine information), as well as other configuration data for the data storage system.

Improved techniques provide applications with the ability to securely store credentials within data security mechanisms of a data storage system. In particular, a set of credentials remains in encrypted form when stored deeply within a particular data security mechanism, and a fingerprint which includes a unique identifier and a set of stable variables is required to properly retrieve the set of credentials from the particular data security mechanism. Moreover, storage for the particular data security mechanism can be located among critical storage devices for the data storage system (e.g., a persistent storage manager area) to prevent loss of the credentials as data storage system components are replaced over time (e.g., disk drives, storage processor modules, etc.).

One embodiment is directed to a method of providing secure access to a set of credentials within a data storage system. The method includes obtaining a unique identifier and a set of stable values; and, in response to a storage request from a client application, storing a set of credentials of the client application within a data security mechanism of the data storage system. The set of credentials is in encrypted form when stored within the data security mechanism of the data storage system. The method further includes configuring the data security mechanism of the data storage system to provide the set of credentials in non-encrypted form in response to new fingerprints matching a system fingerprint which is formed at least in part from the unique identifier and the set of stable values.

Other embodiments are directed to improved data storage systems, data storage assemblies, computer program products, and other processes, etc. Such embodiments provide secure techniques for safely guarding credentials on behalf data storage system applications (e.g., a system graphical user interface, service role tools, upgrade routines, component replacement utilities, etc.).

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique provides an application with the ability to securely store a set of credentials within a data security mechanism of a data storage system. The set of credentials remains encrypted when stored deeply within the data security mechanism. Additionally, a fingerprint which includes (i) a unique identifier (e.g., a hostname which is unique to the system) and (ii) a set of stable variables (e.g., machine-generated codes which are random to users) is required to properly access the set of credentials from the data security mechanism. Furthermore, storage for the data security mechanism can be located among critical storage devices for the data storage system (e.g., a persistent storage manager area) to safeguard the set of credentials as components are replaced over time (e.g., disk drives, storage processor modules, etc.).

Figure 1:
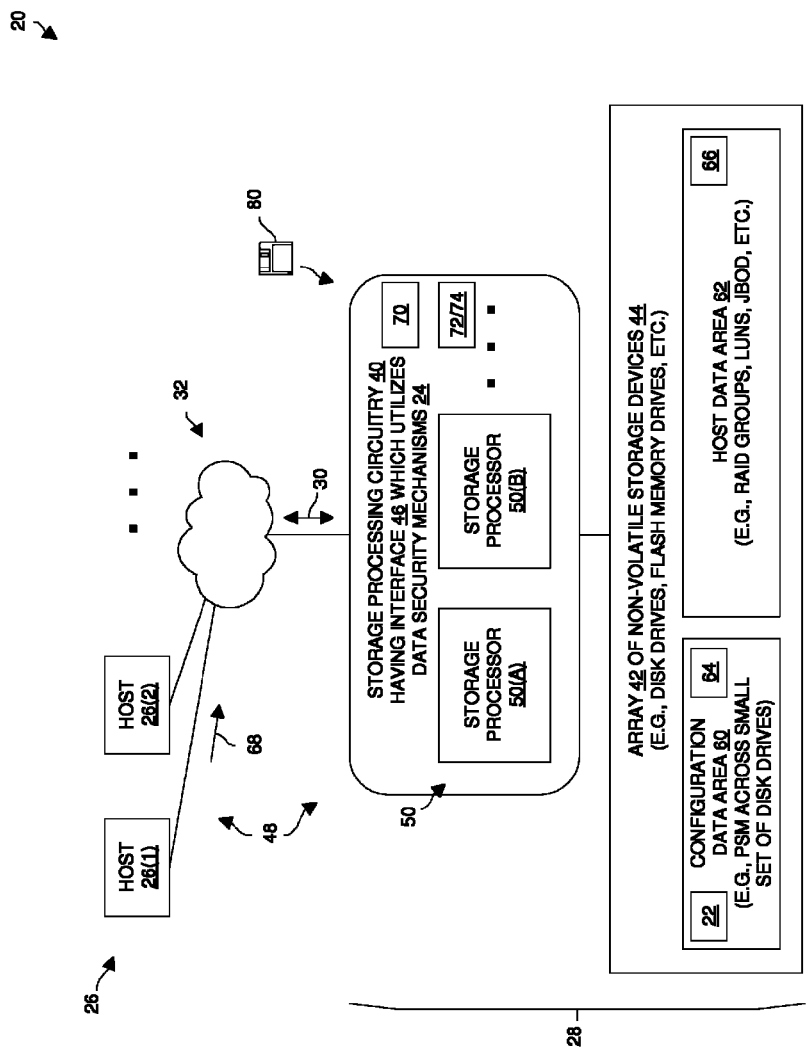
FIG. 1 is a block diagram of a data storage system which provides secure access to a set of credentials using a data security mechanism.

FIG. 1 shows a data storage system 20 which provides secure access to credentials 22 using data security mechanisms 24. The data storage system 20 includes a set of hosts 26(1), 26(2), . . . (collectively, hosts 26) and a data storage assembly 28. The hosts 26 communicate with the data storage assembly 28 by exchanging electronic signals 30 (e.g., fiber optic signals, electrical signals, wireless signals, combinations thereof, etc.) over a communications medium 32 (e.g., a storage fabric, a computerized network, combinations thereof, etc.) with connects the hosts 26 and the data storage assembly 28 together.

The data storage assembly 28 includes storage processing circuitry 40 and an array 42 of non-volatile storage devices 44. The storage processing circuitry 40 is constructed and arranged to provide an interface 46 which creates and utilizes the data security mechanisms 24 to secure and protect the credentials 22 on behalf of various applications 48 running within the system 20. In some arrangements, the storage processing circuitry 40 includes multiple storage processors 50(A), 50(B), . . . (collectively, storage processors 50). Each storage processor 50 is capable of being replaced during the lifetime of the data storage system 20.

The interface 46 initially creates and configures the data security mechanisms 24 to provide secure storage for the applications 48. This activity will be described in further detail shortly. Although an application 48 will typically access a respective data security mechanism 24, it is possible for multiple applications 48 to share access to a single data security mechanism 24. The applications 48 may run in the hosts 26, in the user space of the storage processors 50, or in both.

As further shown in FIG. 1, the array 42 of non-volatile storage devices 44 provides a configuration data area 60 and a host data area 62. The storage processing circuitry 40 writes system configuration data 64 into and reads system configuration data 64 from the configuration data area 60 when carrying out certain operations such as when making changes to the data storage system 20 and when reporting certain status to a user application. The configuration data 64 preferably includes, among other things, configuration information required for proper operation of the data storage system 20 (e.g., hostnames, LUN or volume information, username and password information, virtual machine configuration information, and so on). An example of the configuration data area 60 is storage allocated for a persistent storage manager module (PSM) of the data storage system 20.

Additionally, during array operation, the storage processing circuitry 40 writes host data 66 into and reads host data 66 from the host data area 62 on behalf of the hosts 26. Such operations occur in response to data storage requests 68 from the hosts 26 (also see the electronic signals 30 in FIG. 1).

It should be understood that both the configuration data area 60 and the host data area 62 are allocated storage areas which are preferably formed by multiple storage devices 44 (e.g., disk drives, flash memory drives, etc.) running a fault tolerant protocol. Along these lines, the storage devices 44 can be organized as just a bunch of disks (JBOD), volumes, LUNs, RAID groups (e.g., RAID 0, RAID 1, RAID 5, etc.), and so on which are capable of protecting data against various types of failures. For example, in some arrangements, the configuration data area 60 redundantly resides on a small set of disk drives (e.g., four disk drives running a RAID protocol) which are designated for holding PSM data. Similarly, other storage devices 44 can be grouped and arranged to effectively and efficiently hold the host data area 62. Each storage device 44 of the array 42 is capable of being replaced (e.g., hot swapped) during the lifetime of the data storage system 20.

As mentioned earlier, the interface 46 creates a data security mechanism 24 and then stores credentials 22 of an application 48 securely within the data security mechanism 24 on behalf of the application 48. To store the credentials 22 within the data security mechanism 24 and subsequently retrieve the credentials 22 from the data security mechanism 24, the interface 46 provides a set of standard library of routines, function calls, procedures, etc. which can be invoked by the application 48. In some implementations, the interface 46 provides an application programming interface (API) and the application 48 stores a credential 22 by passing it to the interface 46 which then, in combination with the data security mechanism 24, handles encryption/decryption, guarding of encryption keys, and direction of credential storage to the configuration data area 60 of the array 42 in a manner that is transparent to the application 48.

To initially create and configure the data security mechanism 24 to provide secure storage for an application 48, the interface 46 obtains a unique identifier 70 and a set of stable values 72. In some arrangements, the unique identifier 70 is a hostname of the particular host 26 running the application 48 when the hostname is unique to the data storage system 20. The hostname is obtainable from the configuration data area 60 which stores the configuration data of the data storage system 20. In some arrangements, the set of stable values 72 are machine-generated codes from a code generator 74 which are random to users of the system 20.

The set of stable values 72 is preferably generated by a code generator 74 of the storage processing circuitry 40 (e.g., a separate application/module running on the storage processing circuitry 40). In some arrangements, each stable value 72 is randomly generated and has a minimum length of 8 characters (64 bits) and a maximum length of 255 characters (2040 bits). In some arrangements, each stable value 72 contains at least one lower case character, one upper case character, one digit and one special character for added security.

Once the interface 46 receives the unique identifier 70 and the set of stable values 72, the interface 46 creates the data security mechanism 24 and configures the data security mechanism 24 to allow access to secure storage using a system fingerprint. The system fingerprint is based on both the unique identifier 70 and the set of stable values 72, e.g., a combination of the unique identifier 70 and the set of stable values 72.

It should be understood that the operations of (i) obtaining the unique identifier 70 and the set of stable values 72, (ii) creating the data security mechanism 24, and (iii) configuring the data security mechanism 24 to use the system fingerprint, are preferably performed in a manner which is transparent to the application 48. In particular, the interface 46 is able to acquire, as the unique identifier 70, the hostname of the host 26 running the application 48 from the configuration data stored in the configuration data area 30. Additionally, the interface 46 is able to acquire and save, as the set of stable values 72, machine-generated codes. The interface 46 is able to carry out these activities independently without assistance from the application 48.

Once the data security mechanism 24 is created and configured, the interface 46 is capable of receiving the credentials 22 from the application 48 and storing the credentials 22 in encrypted form as a set of files within the configuration data area 60 of the array 42. Accordingly, the credentials 22 enjoy the same safeguarding as other configuration data 64 of the system 20.

When the application 48 requires subsequent access to the credentials 22 (e.g., during a user login operation), the interface 46 obtains the unique identifier 70 and the set of stable values 72 in real time, and delivers this information to the data security mechanism 24. The data security mechanism 24 dynamically generates a current fingerprint and compares the current fingerprint to the earlier-created system fingerprint. Only if the current fingerprint matches the system fingerprint does the data security mechanism 24 decrypt the credentials 22 and provide the decrypted credentials 22 to the application 48 through the interface 46.

As mentioned earlier, the interface 46 initially creates and configures a data security mechanism 24 for an application 48 and then operates as a conduit which enables that application 48 to subsequently access the credentials 22 stored within the data security mechanism 24 (e.g., the interface 46 provides wrapper and callback functions to the data security mechanism 24). To this end, the data security mechanism 24 includes an executable portion which runs within the storage processing circuitry 40 and a storage portion which resides within the configuration data area 60 (e.g., within the PSM). Once the data security mechanism 24 is created, the data security mechanism 24 uses keys for encryption and decryption. These keys are unique and random from a user's perspective and are automatically managed by the data security mechanism 24.

It should be understood that the data security mechanism 24 may employ certain features from standard lockbox modules/files such as cryptographic keys, passwords, and configuration data. An example of product which is similar to such a standard lockbox module/file is the Common Security Toolkit (CST) Lockbox which is available from RSA Security Inc. of Bedford, Mass.

In some arrangements, the data security mechanism 24 further includes in-memory storage within the storage processing circuitry 40 (i.e., local semiconductor memory). In these arrangements, the credentials 22 always remain in encrypted form while the credentials 22 of the application 48 reside in the configuration data area 60. The credentials 22 are decrypted only after a copy of the credentials 22 is moved into the in-memory storage within the storage processing circuitry 40. Such operation by the interface 46 enables the reduction of frequent input/output (I/O) operations to the configuration data area 60 (i.e., a large number of reads of the configuration data area 60 in a short period of time) since access can be restricted at least temporarily to the local, in-memory copy of the credentials 22.

An example of an application 48 which benefits from the secure handling of credentials 22 in the manner described above is a service role tool application which provides a set of service accounts requiring user logins which use usernames and passwords. Another example of such an application 48 is a graphical user interface (GUI) (i.e., a system management application) which displays particular views of virtual machine information of the data storage system 20 such as information regarding ESX servers offered by VMWare of Palo Alto, Calif. Other application examples include upgrade routines and procedures, new storage processor routines, and the like. For such applications 48, the interface 46 directs the data security mechanisms 24 to maintain their credentials 22 (e.g., usernames and passwords, virtual machine configuration information) in encrypted form within the configuration data area 60 of the array 42. As a result, the applications 60 are able to store their credentials 22 securely within the data security mechanisms 24 through the interface 46.

It should be understood that the set of stable values 72 is preferably stored in a secure and safe manner outside the data security mechanism 24. In some arrangements, the interface 46 stores the set of stable values 72 on behalf of the application 48 as configuration data 64 in the configuration data area 60 of the array 42 but separately from the data security mechanism 24. As a result, any part of the data storage system 20 can be lost and replaced with the exception of the configuration data area 60, and the application 48 will be able to maintain access to the credentials 22. For example, the hardware of the host 26 can be replaced with new hardware which is given the same hostname. As another example, the storage processing circuitry 40 can be replaced with new storage processing circuitry 40. Moreover, any of the storage devices 44 can be replaced (even one or more disks forming the configuration data area 60) as long as coherency of the configuration data area 60 is preserved. In all of these situations, the interface 46 is capable of dynamically generating a current fingerprint from the unique identifier 70 and the set of stable value 72, and then gaining access to the credentials 22 which are securely stored in the configuration data area 60.

It should be further understood that the interface 46 is capable of being delivered to and installed in the storage processing circuitry 40 from a computer program product 80 (illustrated generally by a diskette icon 80). Such a computer program product 80 includes a computer readable storage medium which stores instructions that are executed by the storage processing circuitry 40. Examples of suitable computer readable storage media include CD-ROM, flash memory, disk memory, tape memory, and so on. Further details of how the interface 46 creates and uses a data security mechanism 24 will now be provided with reference to FIGS. 2 and 3.

Figure 2:
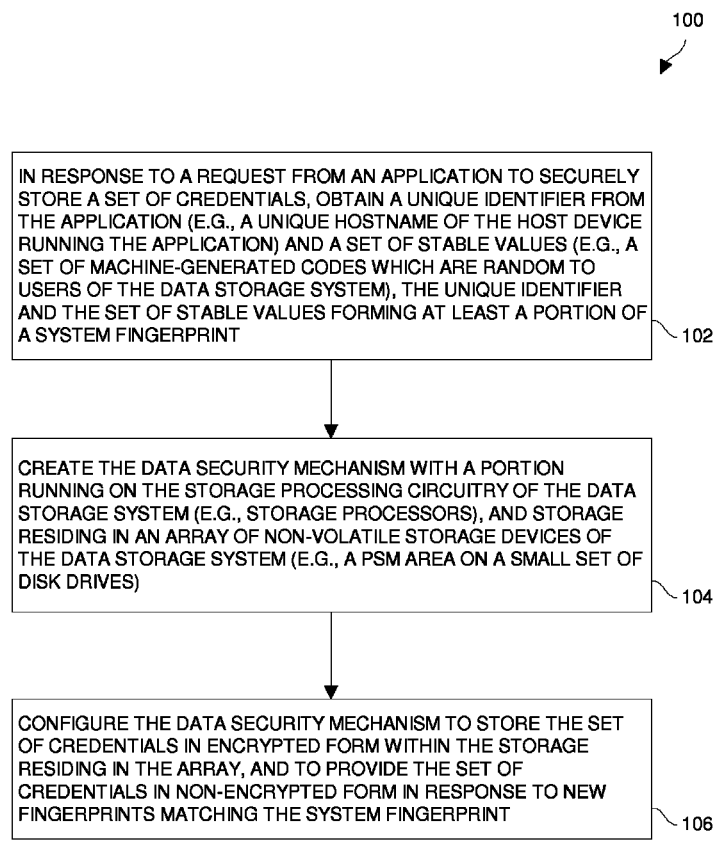
FIG. 2 is a flowchart of a procedure for creating and configuring the data security mechanism of FIG. 1.
Figure 3:
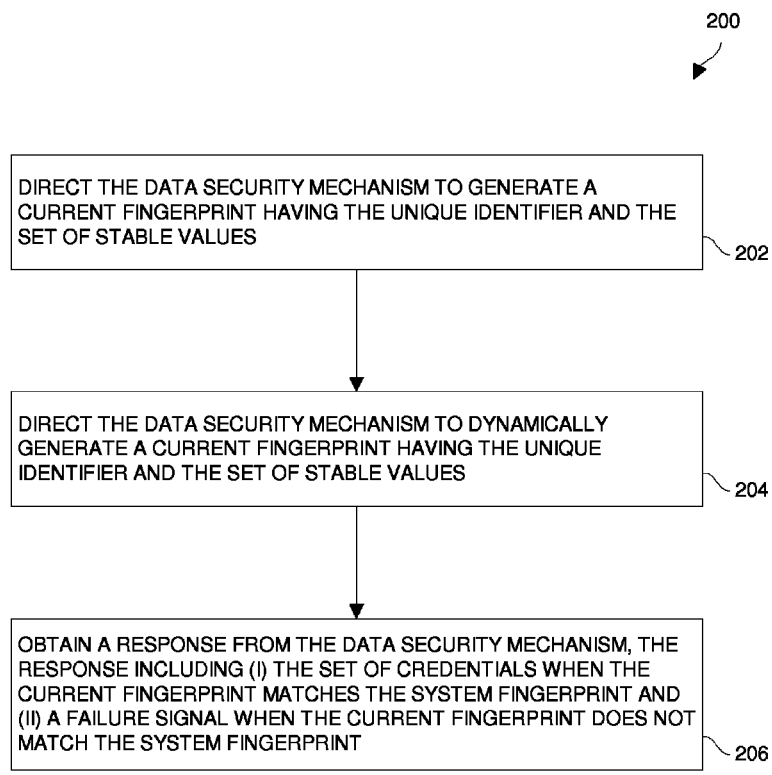
FIG. 3 is a flowchart of a procedure for accessing the set of credentials from the data security mechanism of FIG. 1.

FIGS. 2 and 3 are flowcharts of procedures 100, 200 which are performed by the interface 46. In particular, FIG. 2 is a flowchart of a procedure 100 for creating and configuring a data security mechanism 24, and storing credentials 22 within the data security mechanism 24. FIG. 3 is a flowchart of a procedure 200 for subsequently accessing the credentials 22 from the created data security mechanism 24.

With reference to FIG. 2, in step 102 of the procedure 100, the interface 46 receives a command from an application 48 to securely store a set of credentials 22. In response to the command, the interface 46 obtains a unique identifier 70 and a set of stable values 72. While it is possible to configure a data security mechanism 24 to be accessible from multiple applications 48, a more-typical situation includes each application 48 creating and accessing a respective data security mechanism 24.

In step 104, the interface 46 creates the data security mechanism 24 to store the set of credentials 22 on behalf of the application 48. The created data security mechanism runs on the storage processing circuitry 40 and has storage residing in the array 42 of non-volatile storage devices 44. In particular, the interface 46 directs the storage to reside within the configuration data area 60 (e.g., the PSM, also see FIG. 1).

In step 106, the interface 46 configures the data security mechanism 24 to store the set of credentials 22 in encrypted form, and to provide the set of credentials in non-encrypted form in response to new fingerprints matching the system fingerprint. At this point, the interface 46 stores a set of credentials 22 (e.g., as one or more encrypted files) within the data security mechanism 24 on behalf of the application 48.

At this point, the set of credentials 22 is securely protected within the data security mechanism 24. Along these lines, the interface 46 requires continued access to the unique identifier 70 and the set of stable values 72 in order to properly retrieve the set of credentials 22.

With reference to FIG. 3, the procedure 200 is performed during any subsequent attempt to access the set of credentials 22 stored in the data security mechanism 24. In step 202, the interface 46 receives an access request from the application 48. In response to the access request (e.g., a command sent by the application 48 to the interface 46), the interface 46 re-acquires the unique identifier 70 the set of stable values 72. Recall that, in some arrangements, the unique identifier 70 is the hostname of the host 26 running the application 48 and is read from the configuration data area 60 of the array 42, and the set of stable values is a set of machine-generated codes which are random to the users of the application 48 and which are saved separately outside the data security mechanism 24 by the interface 46.

In step 204, the interface 46 directs the data security mechanism 24 to generate a current fingerprint having the unique identifier 70 and the set of stable values 72. As a result, the data security mechanism 24 dynamically derives the current fingerprint.

In step 206, the interface 46 obtains access to the set of credentials 22 in non-encrypted form and provides the set of credentials 22 to the application 48 when the current fingerprint matches the system fingerprint, and does not obtain access to the set of credentials 22 when the current fingerprint does not match the system fingerprint. In particular, under direction of the interface 46, the data security mechanism 24 compares the current fingerprint to the earlier-created system fingerprint to determine whether to provide access to the set of credentials 22. If there is a match, the data security mechanism 24 decrypts the set of credentials and allows the application 48 to access the decrypted set of credentials 22 through the interface 46. However, if the current fingerprint does not match the system fingerprint, the data security mechanism 24 provides a failure signal and the interface 46 provides a failure response to the application 48. Further details will now be provided with reference to FIG. 4.

Figure 4:
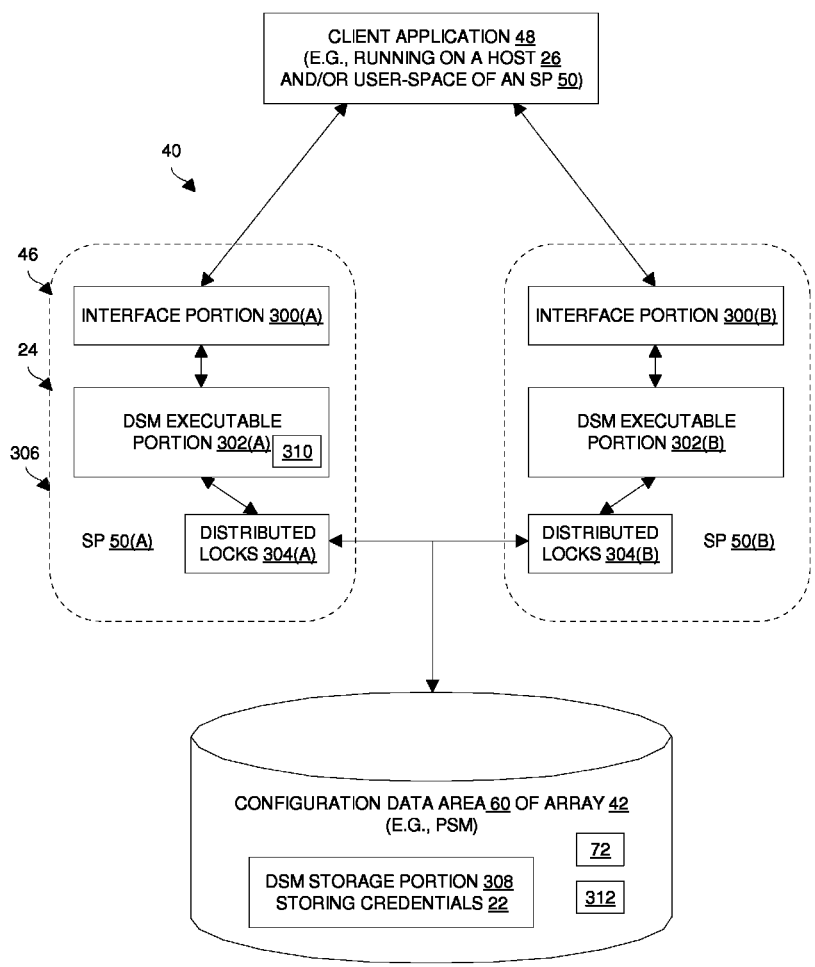
FIG. 4 is a block diagram of particular components of the data storage system of FIG. 1 which are involved in providing secure access to the set of credentials.

FIG. 4 illustrates particular details of the data storage system 20 when multiple storage processors 50(A), 50(B) work together to provide secure access to the set of credentials 22 of a client application 48 (also see FIG. 1). As shown in FIG. 2, the storage processor 50(A) runs a portion 300(A) of the interface 46, an executable portion 302(A) of a data security mechanism 24 associated with the application 48, and a portion 304(A) of a distributed locking mechanism 306. Similarly, the storage processor 50(B) runs a portion 300(B) of the interface 46, an executable portion 302(B) of the data security mechanism 24 associated with the application 48, and a portion 304(B) of the distributed locking mechanism 306.

As further shown in FIG. 4, the configuration data area 60 of the array 42 (e.g., the PSM) holds a storage portion 308 of the data security mechanism 24 which stores the set of credentials 22 of the application 48. Furthermore, the application 48 may run on a host 26, the user space of the storage processors 48, or both.

During operation, the application 48 communicates with one of the portions 300(A), 300(B) of the interface 46 running on one of the storage processors 50(A), 50(B). That portion of the interface 46 then directs a corresponding portion 302(A), 302(B) of the data security mechanism 24 to access the set of credentials 22 within the configuration data area 60 of the array 42.

To coordinate access to the set of credentials 22, the portions 302(A), 302(B) of the data security mechanism 24 employ distributed locks, e.g., see the portions 304(A), 304(B) of the distributed locking mechanism 306. Such locks ensure coherency of the set of credentials 22.

As further shown in FIG. 4, the configuration data area 60 holds the set of stable values 72 separately from the storage portion 308 of the data security mechanism 24. Accordingly, the host 26 running the application 48 can be replaced and the data security mechanism 24 maintains access to the set of stable values 72 for proper dynamic generation of new fingerprints 310 (e.g., see the portion 302(A) of the data security mechanism 24).

Moreover, the original system fingerprint 312 can be stored safely in the configuration data area 60 as well. Accordingly, the storage processing circuitry 40 can be replaced and the data security mechanism 24 will still have access to the system fingerprint 312 for proper security control.

As described above, improved techniques provide applications 48 with the ability to securely store credentials 22 within data security mechanisms 24 of a data storage system 20. In particular, the credentials 22 remain in encrypted form when stored deeply within a particular data security mechanism 24, and a fingerprint 310 which includes a unique identifier 70 and a set of stable variables 72 is required to properly retrieve the credentials 22 from the particular data security mechanism 24. Moreover, storage 308 for the particular data security mechanism 24 can be located among critical storage devices 44 of the data storage system 20 (e.g., the PSM) to prevent loss of the credentials 22 as components of the system 20 are replaced over time (e.g., disk drives, storage processor modules, etc.).

While various embodiments of the invention have been particularly shown and described, it will be understood by those skilled in the art that various changes in form and details may be made therein without departing from the spirit and scope of the invention as defined by the appended claims.

What is claimed is:

1. A data storage assembly, comprising:
   storage processing circuitry; and
   an array of non-volatile storage devices coupled to the storage processing circuitry, the storage processing circuitry running an interface which is constructed and arranged to:
   obtain a unique identifier and a set of stable values,
   in response to a storage request from a client application, store a set of credentials of the client application within a data security mechanism, the set of credentials being in encrypted form when stored within the data security mechanism, and
   configure the data security mechanism to provide the set of credentials in non-encrypted form in response to new fingerprints matching a system fingerprint which is formed at least in part from the unique identifier and the set of stable values;
   wherein the unique identifier and the set of stable values include at least:
   a hostname from a hostname parameter stored in the data storage assembly as the unique identifier, and
   a set of machine-generated codes from a set of code storage locations within the data storage assembly as the set of stable values, wherein each machine-generated code includes a sequence of symbols including at least one lower case character, at least one upper case character, at least one digit, and at least one special character to prevent a fraudster from easily duplicating a storage location environment of the data storage assembly; and
   wherein the data security mechanism of the data storage assembly is configured to:
   set the data security mechanism to (i) expose the set of credentials in non-encrypted form when at least a certain number of the read hostname and the read machine-generated codes match an expected hostname and expected machine-generated codes, and (ii) not expose the set of credentials in non-encrypted form when less than the certain number of the read hostname and the read machine-generated codes match the expected hostname and the expected machine-generated codes, the certain number being less than all of the read hostname and the read machine-generated codes matching the expected hostname and expected machine-generated codes.

2. A data storage assembly as in claim 1 wherein the client application runs on a host device which is coupled to the data storage assembly;
   wherein the data security mechanism runs on the storage processing circuitry;
   wherein the host device has a hostname which is unique within the data storage assembly; and
   wherein the interface, when obtaining the unique identifier and the set of stable values, is constructed and arranged to read, as the unique identifier, the hostname of the host device from a hostname source of the data storage assembly.

3. A data storage assembly as in claim 2 wherein the interface, when obtaining the unique identifier and the set of stable values, is further constructed and arranged to:
 acquire, as the set of stable values, a set of machine-generated codes from a code generator of the data storage assembly, the set of machine-generated codes being random to users of the client application.

4. A data storage assembly as in claim 3 wherein the interface is further constructed and arranged to:
 after the data security mechanism is configured to provide the set of credentials in non-encrypted form in response to new fingerprints matching the system fingerprint, receive an access request from the client application running on the host device;
 in response to the access request, provide the hostname of the host device and the set of machine-generated codes to the data security mechanism; and
 (i) provide the set of credentials in non-encrypted form from the data security mechanism to the client application when a current fingerprint based on the provided the hostname of the host device and the set of machine-generated codes matches the system fingerprint, and (ii) not provide the set of credentials to the client application when the current fingerprint does not match the system fingerprint.

5. A data storage assembly as in claim 4 wherein the array of non-volatile storage devices provides (i) a host data area to store host data on behalf of the host device and (ii) a configuration data area to store configuration data of the data storage system, the configuration data area being different from the host data area; and
 wherein the interface, when storing the set of credentials within the data security mechanism, is constructed and arranged to write, as the set of credentials in encrypted form, a set of encrypted files to the configuration data area provided by the array of non-volatile storage devices.

6. A data storage assembly as in claim 1 wherein the set of credentials stored within the data security mechanism further includes the data security mechanism located among critical storage devices of the storage processing circuitry.

7. A data storage assembly as in claim 6 wherein the critical storage devices of the storage processing circuitry include a persistent storage manager area comprising a small set of disk drives separated from a host data area and protected from being replaced over time.

8. A method of providing secure access to a set of credentials within a data storage system, the method comprising:
 obtaining a unique identifier and a set of stable values;
 in response to a storage request from a client application, storing a set of credentials of the client application within a data security mechanism of the data storage system, the set of credentials being in encrypted form when stored within the data security mechanism of the data storage system; and
 configuring the data security mechanism of the data storage system to provide the set of credentials in non-encrypted form in response to new fingerprints matching a system fingerprint which is formed at least in part from the unique identifier and the set of stable values;
 wherein obtaining the unique identifier and the set of stable values includes:
 reading, as the unique identifier, a hostname from a hostname parameter stored in the data storage system, and
 reading, as the set of stable values, a set of machine-generated codes from a set of code storage locations within the data storage system, each machine-generated code being a sequence of symbols including at least one lower case character, at least one upper case character, at least one digit, and at least one special character to prevent a fraudster from easily duplicating a storage location environment of the data storage system; and
 wherein configuring the data security mechanism of the data storage system to provide the set of credentials in non-encrypted form in response to new fingerprints includes:
 setting the data security mechanism to (i) expose the set of credentials in non-encrypted form when at least a certain number of the read hostname and the read machine-generated codes matches an expected hostname and expected machine-generated codes, and (ii) not expose the set of credentials in non-encrypted form when less than the certain number of the read hostname and the read machine-generated codes matches the expected hostname and the expected machine-generated codes, the certain number being less than all of the read hostname and the read machine-generated codes matching the expected hostname and expected machine-generated codes.

9. A method as in claim 8 wherein the data storage system includes a host device and storage processing circuitry coupled to the host device;
 wherein the client application runs on the host device;
 wherein the data security mechanism runs on the storage processing circuitry;
 wherein the host device has a hostname which is unique within the data storage system; and
 wherein obtaining the unique identifier and the set of stable values includes reading, as the unique identifier, the hostname of the host device from a hostname source of the data storage system.

10. A method as in claim 9 wherein obtaining the unique identifier and the set of stable values further includes:
 acquiring, as the set of stable values, a set of machine-generated codes from a code generator of the data storage system, the set of machine-generated codes being random to users of the client application.

11. A method as in claim 10, further comprising:
 after the data security mechanism is configured to provide the set of credentials in non-encrypted form in response to new fingerprints matching the system fingerprint, receiving an access request from the client application running on the host device;
 in response to the access request, providing the hostname of the host device and the set of machine-generated codes to the data security mechanism; and
 (i) providing the set of credentials in non-encrypted form from the data security mechanism to the client application when a current fingerprint based on the provided the hostname of the host device and the set of machine-generated codes matches the system fingerprint, and (ii) not providing the set of credentials to the client application when the current fingerprint does not match the system fingerprint.

12. A method as in claim 11 wherein the data storage system further includes an array of non-volatile storage devices coupled to the storage processing circuitry, the array of non-volatile storage devices providing (i) a host data area to store host data on behalf of the host device and (ii) a configuration data area to store configuration data of the data storage system, the configuration data area being different from the host data area; and
 wherein storing the set of credentials within the data security mechanism of the data storage system includes writing, as the set of credentials in encrypted form, a set of encrypted files to the configuration data area provided by the array of non-volatile storage devices.

13. A method as in claim 12 wherein providing the set of credentials in non-encrypted form from the data security mechanism to the client application when the current fingerprint based on the provided hostname of the host device and the set of machine-generated codes matches the system fingerprint includes:
   in response to successfully matching the current fingerprint to the system fingerprint, reading the set of encrypted files from the configuration data area provided by the array of non-volatile storage devices,
   performing a decryption operation to generate the set of credentials in non-encrypted form, and
   outputting the set of credentials in non-encrypted form to the client application.

14. A method as in claim 13 wherein the client application is a service role tool application which provides a set of service accounts requiring user logins;
   wherein the set of credentials includes a set of usernames and passwords for the user logins required by the set of service accounts provided by the service role tool; and
   wherein outputting the set of credentials in non-encrypted form to the client application includes supplying access to the set of usernames and passwords to support performance of a user login operation by the service role tool application.

15. A method as in claim 13 wherein the client application is a graphical user interface (GUI) application which displays virtual machine information;
   wherein the set of credentials includes configuration information associated with multiple virtual machines of the data storage system; and
   wherein outputting the set of credentials in non-encrypted form to the client application includes supplying the configuration information associated with the multiple virtual machines to the GUI application in support of displaying the virtual machine information.

16. A method as in claim 13 wherein the storage processing circuitry includes a first storage processor and a second storage processor, the hostname and the set of stable values being common to both the first storage processor and the second storage processor but being unique to the array of non-volatile storage devices;
   wherein outputting the set of credentials in non-encrypted form to the client application includes furnishing the set of credentials in non-encrypted form from the first storage processor in response to the access request; and
   wherein the method further comprises furnishing the set of credentials in non-encrypted form from the second storage processor in response to another access request.

17. A method as in claim 13 wherein the storage processing circuitry includes semiconductor-based main memory;
   wherein reading the set of encrypted files from the configuration data area provided by the array of non-volatile storage devices includes moving a copy of the set of encrypted files to the semiconductor-based main memory; and
   wherein performing the decryption operation to generate the set of credentials in non-encrypted form includes decrypting the copy of the set of encrypted files in the semiconductor-based main memory while the set of encrypted files in the configuration data area remains intact.

18. A computer program product which comprises a non-transitory computer readable storage medium having instructions stored thereon which, when executed by a computer, cause the computer to provide secure access to a set of credentials on behalf of a client application by:
   obtaining a unique identifier and a set of stable values;
   in response to a storage request from the client application, storing the set of credentials within a data security mechanism, the set of credentials being in encrypted form when stored within the data security mechanism; and
   configuring the data security mechanism to provide the set of credentials in non-encrypted form in response to new fingerprints matching a system fingerprint which is formed at least in part from the unique identifier and the set of stable values;
   wherein obtaining the unique identifier and the set of stable values includes:
   reading, as the unique identifier, a hostname from a hostname parameter stored in the data storage system, and
   reading, as the set of stable values, a set of machine-generated codes from a set of code storage locations within the data storage system, each machine-generated code being a sequence of symbols including at least one lower case character, at least one upper case character, at least one digit, and at least one special character to prevent a fraudster from easily duplicating a storage location environment of the data storage system; and
   wherein configuring the data security mechanism of the data storage system to provide the set of credentials in non-encrypted form in response to new fingerprints includes:
   setting the data security mechanism to (i) expose the set of credentials in non-encrypted form when at least a certain number of the read hostname and the read machine-generated codes matches an expected hostname and expected machine-generated codes, and (ii) not expose the set of credentials in non-encrypted form when less than the certain number of the read hostname and the read machine-generated codes matches the expected hostname and the expected machine-generated codes, the certain number being less than all of the read hostname and the read machine-generated codes matching the expected hostname and expected machine-generated codes.

19. A computer program product as in claim 18 wherein the client application runs on a host device;
   wherein the data security mechanism runs on the computer;
   wherein the host device has a hostname which is unique within the computer; and
   wherein obtaining the unique identifier and the set of stable values includes reading, as the unique identifier, the hostname of the host device from a hostname source of the computer.

20. A computer program product as in claim 19 wherein obtaining the unique identifier and the set of stable values further includes:
   acquiring, as the set of stable values, a set of machine-generated codes from a code generator of the computer, the set of machine-generated codes being random to users of the client application.

21. A computer program product as in claim 18 wherein the instructions further cause the computer to:
   after the data security mechanism is configured to provide the set of credentials in non-encrypted form in response to new fingerprints matching the system fingerprint, receive an access request from the client application running on the host device;

in response to the access request, provide the hostname of the host device and the set of machine-generated codes to the data security mechanism; and (i) provide the set of credentials in non-encrypted form from the data security mechanism to the client application when a current fingerprint based on the provided hostname of the host device and the set of machine-generated codes matches the system fingerprint, and (ii) not provide the set of credentials to the client application when the current fingerprint does not match the system fingerprint.

22. A computer program product as in claim 21 wherein the computer includes storage which provides (i) a host data area to store host data on behalf of the host device and (ii) a configuration data area to store configuration data of the computer, the configuration data area being different from the host data area; and wherein storing the set of credentials within the data security mechanism includes writing, as the set of credentials in encrypted form, a set of encrypted files to the configuration data area provided by the storage of the computer.

* * * * *